US007399246B2

(12) United States Patent
Holmes et al.

(10) Patent No.: US 7,399,246 B2
(45) Date of Patent: Jul. 15, 2008

(54) HYBRID POWER TRANSMISSION

(75) Inventors: Alan G. Holmes, Clarkston, MI (US); Michael R. Schmidt, Carmel, ID (US)

(73) Assignee: GM Global Technology Operations, Inc., Detroit, MI (US)

( * ) Notice: Subject to any disclaimer, the term of this patent is extended or adjusted under 35 U.S.C. 154(b) by 287 days.

(21) Appl. No.: 11/403,239

(22) Filed: Apr. 12, 2006

(65) Prior Publication Data

US 2007/0243966 A1    Oct. 18, 2007

(51) Int. Cl.
*F16H 3/72* (2006.01)

(52) U.S. Cl. .......................................... 475/5

(58) Field of Classification Search ................ 475/5; 180/65.7; 903/911
See application file for complete search history.

(56) References Cited

U.S. PATENT DOCUMENTS 7,022,038 B2 *   4/2006   Schmidt et al. ............. 475/5

* cited by examiner

*Primary Examiner*—Dirk Wright

(57) ABSTRACT

A hybrid powertrain includes a hybrid transmission having an engine input and two motor/generator units, which are interconnected by a planetary gear mechanism and three selectively engageable torque-transmitting mechanisms to establish three modes of transmission operation including an input split mode, a first compound split mode, and a second compound split mode.

5 Claims, 4 Drawing Sheets

__US 7,399,246 B2__

HYBRID POWER TRANSMISSION

TECHNICAL FIELD

This invention relates to hybrid power transmissions and, more particularly, to hybrid power transmissions having a mechanical input and two motor/generator inputs.

BACKGROUND OF THE INVENTION

Hybrid transmissions have been proposed for a number of years. Generally, they include an internal combustion engine and an electrical motor/generator unit wherein the engine and motor/generator are combined with a planetary gearset to provide an output drive in at least one mode of operation. It has also been proposed to provide multiple modes of operation including input split modes, output split modes, and compound split modes. Each of these transmission types has their own unique gearing arrangements, which establish the combination of ranges or modes in which the transmission operates.

SUMMARY OF THE INVENTION

It is an object of the present invention to provide an improved hybrid power transmission having an internal combustion engine and an electrically variable transmission.

In one aspect of the present invention, the internal combustion engine and two motor/generators (M/Gs) are combined with gearing mechanisms, such as planetary gearsets or planetary gear arrangements to provide three modes of operation.

In another aspect of the present invention, the planetary gearset has three continuously connected inputs and three selectively connectible outputs.

In yet another aspect of the present invention, the selectable outputs are engaged with the planetary gearset through torque-transmitting mechanisms that are selectively engageable.

In still another aspect of the present invention, the planetary gearing arrangement is in the form of a single compound planetary arrangement.

In a further aspect of the present invention, the planetary gearset is in the form of an interconnected simple planetary gearset.

In still a further aspect of the present invention, both of the planetary gear arrangement types have at least one input continuously connected with the engine, one input continuously connected with one of the motor/generator units and another input connected with the other of the motor/generator units.

In yet a further aspect of the present invention, wherein a hybrid transmission is selectively operable to provide an input split mode, a first compound split mode, and a second compound split mode.

DESCRIPTION OF THE EXEMPLARY EMBODIMENTS

Figure 1:
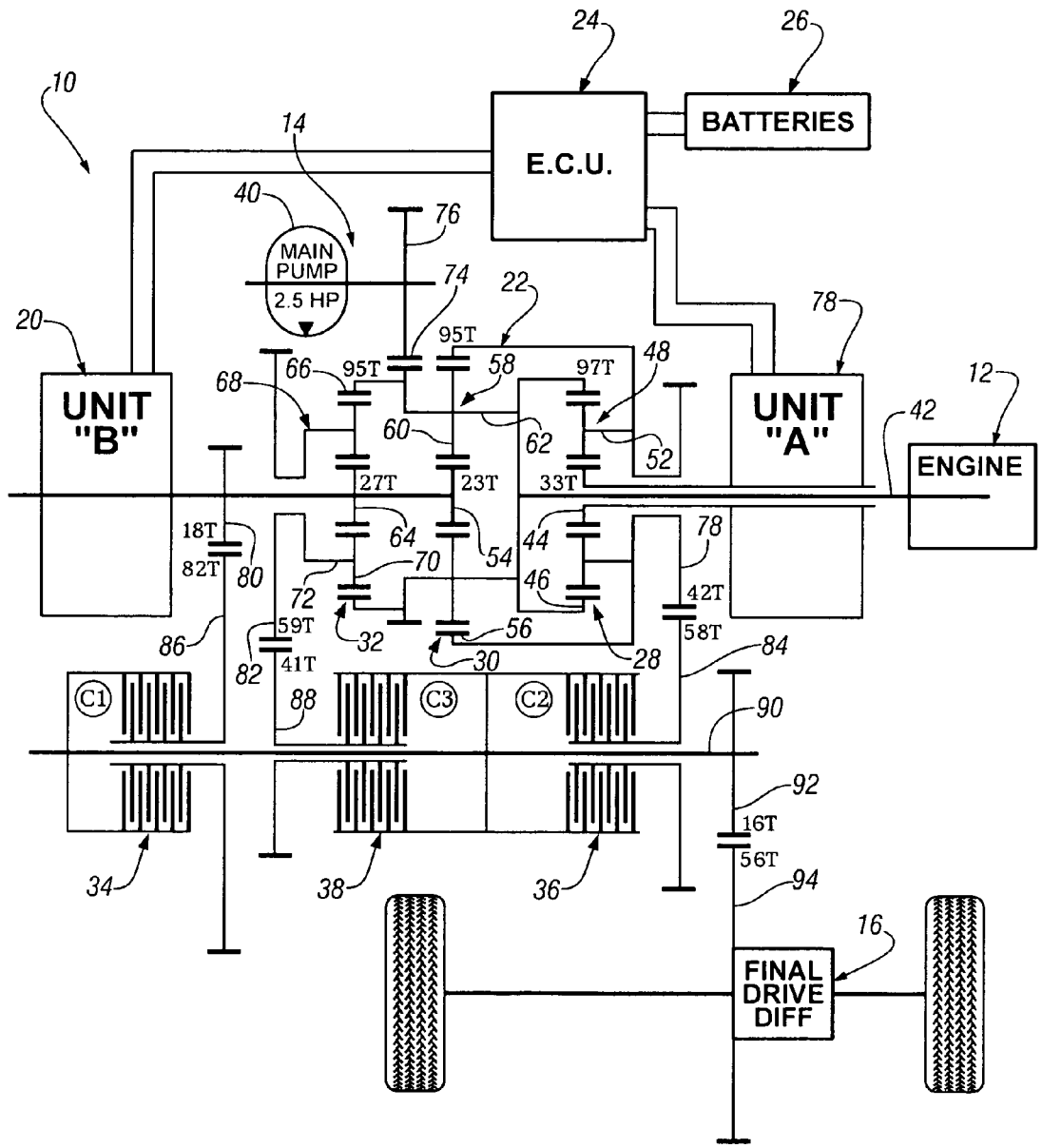
FIG. 1 is a schematic representation of a powertrain having a transmission incorporating the present invention.

Referring to FIG. 1 of the drawings, there is seen a powertrain 10 having a conventional internal combustion engine 12, a hybrid transmission 14, and a final drive differential 16. The hybrid transmission 14 includes a first motor/generator unit 18, a second motor/generator unit 20, and planetary gear arrangement 22, an electronic control unit (ECU) 24, and an energy storage unit 26.

The energy storage unit 26 is a plurality of storage batteries, which are conventional devices. The ECU 24 is an electronic control mechanism, which is effective to supply power between the batteries and the M/G units 18 and 20 and also from one M/G unit to the other as well as from the M/G units to the batteries.

The planetary gear arrangement 22 includes three simple planetary gearsets 28, 30, and 32 and three selectively engageable torque-transmitting mechanisms 34, 36, and 38. The torque-transmitting mechanisms 34, 36, and 38 are conventional rotating type torque-transmitting mechanisms commonly named clutches, which are fluid-operated in a well-known manner and the operation and control thereof may be arranged through the ECU 24. The power to operate the torque-transmitting mechanisms 34, 36, and 38 is supplied by a conventional hydraulic pump 40, which is continuously driven by the engine 12 from an input shaft 42.

The planetary gearset 28 includes a sun gear member 44, a ring gear member 46, and a planet carrier assembly member 48, which is comprised of a plurality of pinion gears 50 rotatably mounted on a planet carrier member 52 and disposed in meshing relationship with the sun gear member 44 and the ring gear member 46.

The planetary gearset 30 includes a sun gear member 54, a ring gear member 56, and a planet carrier assembly member 58, which is comprised of a plurality of pinion gears 60 rotatably mounted on a planet carrier member 62 and disposed in meshing relationship with the sun gear member 54 and the ring gear member 56.

The planetary gearset 32 includes a sun gear member 64, a ring gear member 66, a planet carrier assembly member 68, which is comprised of a plurality of pinion gears 70 rotatably mounted on a planet carrier member 72 and disposed in meshing relationship with the sun gear member 64 and the ring gear member 66.

The sun gear member 44 is continuously drivingly connected with the M/G unit 18. The ring gear member 46, planet carrier member 62 and ring gear member 66 are continuously drivingly connected with the input shaft 42 and therefore the engine 12. The planet carrier member 62 and ring gear member 66 have connected therewith a spur gear 74, which meshes with a spur gear 76 and operatively rotates the pump 40.

The planet carrier member 52 and ring gear member 56 are continuously drivingly interconnected and are also connected with an output gear 78. The sun gear member 54 and sun gear member 64 are continuously drivingly connected with the M/G unit 20. An output gear 80 is also connected with the sun gears 54 and 64 and the M/G unit 20.

The planet carrier member 72 is drivingly connected with an output gear 82. The output gear 78 is drivingly connected with an output gear 84, which is operatively drivingly connected with a portion of the torque-transmitting mechanism 36. The output gear 80 is meshing with an output gear 86, which is operatively connected with the torque-transmitting mechanism 34. The output gear 82 is meshing with an output gear 88, which is operatively connected with the torque-transmitting mechanism 38.

The torque-transmitting mechanisms 34, 36, and 38 are each operatively connected with a transmission output shaft 90, which has connected therewith a drive gear 92 meshing with a driven gear 94, which provides input drive to the final drive differential 16. Selective engagement of the torque-transmitting mechanism 34 provides a drive connection between the output gear 80 and the final drive differential 16. Selective engagement of the torque-transmitting mechanism 36 provides a drive connection between the output gear 78 and the final drive differential 16. Selective engagement of the torque-transmitting mechanism 38 provides a drive connection between the output gear 82 and the final drive differential 16.

Figure 3:
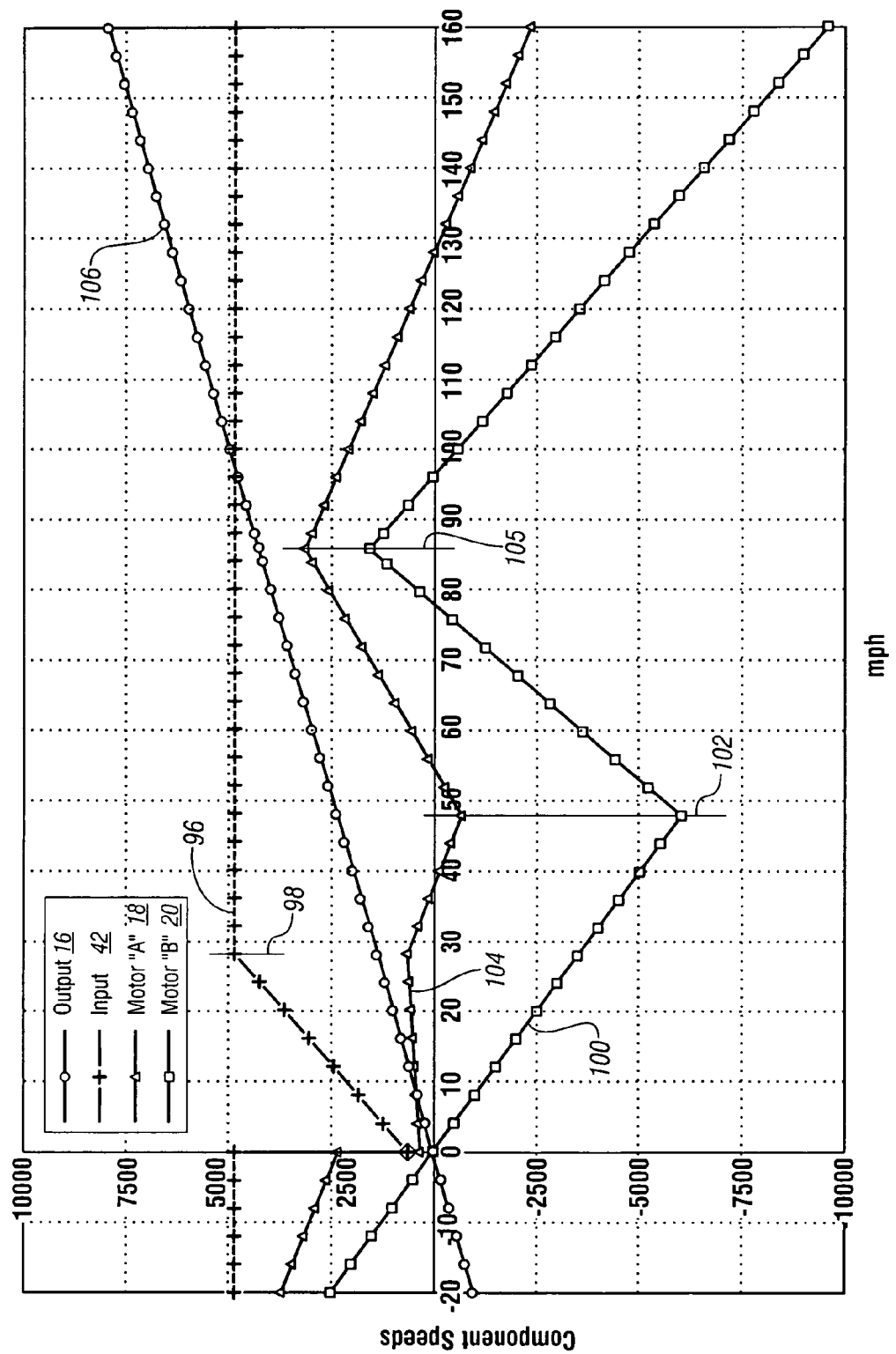
FIG. 3 is a plurality of curves showing the speed of the input, output, and motor/generator components versus vehicle speed.

FIG. 3 is a plurality of curves depicting the speed of the input shaft 42, the output speed of the final drive differential 16, the speed of the M/G unit 18, and the speed of the M/G unit 20. At launch or zero speed, the torque-transmitting mechanism 34 is engaged such that a drive connection between the M/G unit 20 and the final drive differential 16 is established. This also permits a drive connection between the engine 12 and the final drive differential 16 as well as the M/G unit 18 and the final drive differential 16.

The engine speed represented by curve or line 96 increases from the zero position out to a point 98 at which the engine 12 reaches its maximum governed speed. The M/G unit 20 increases in speed to provide a negative or reverse operation along curve or line 100 and increases in a negative speed along curve 100 to point 102 to establish a first input split mode of the powertrain 10. The M/G unit 18 progresses along curve or line 104 at a slight rise in speed for a portion of the first mode of operation and then decreases in speed through zero and then increasing at a negative speed to point 102.

At point 102, the first interchange is made such that the torque-transmitting mechanism 34 is disengaged and the torque-transmitting mechanism 36 is engaged. This occurs at a synchronous speed, which is determined by the gear ratios of the gears 78, 84 as well as the planetary action contributed by the planet carrier member 52 and the ring gear member 56.

Following the interchange, the M/G unit 20 is controlled along the curve 100 from the point 102 to the point 105, the engine speed curve 96 is constant and the speed of the M/G unit 18 is controlled along the curve 104 from the point 102 to point 105.

At point 105, the torque-transmitting mechanisms 36 and 38 are synchronously interchanged to establish the third mode of operation. During the third mode of operation, the speed of the M/G unit 20 is controlled along the curve 100 in a fashion shown in FIG. 3, as is the speed of the M/G unit 18. It can be seen that curve or line 106, which represents the vehicle output speed, is continuous from zero to the maximum forward speed value and also continuous in a negative direction from zero to a maximum reverse speed. The first mode of operation, as previously mentioned, is an input split mode, the second mode of operation from point 102 to point 105 is a compound split mode, and from point 105 to the maximum speed is the third mode of operation, which is also a compound split mode.

The curves shown in FIG. 3 are full power curves, that is, the engine is operating at maximum power, and the M/G units 18 and 20 are controlled by the ECU 24 to operate as required to provide the desired output. Other speeds are available by reducing the engine speed and/or the speed of the M/G units 18 and 20 such that the maximum range of vehicle speed will vary with the input speed controlled by the engine and the M/G units 18 and 20.

Figure 2:
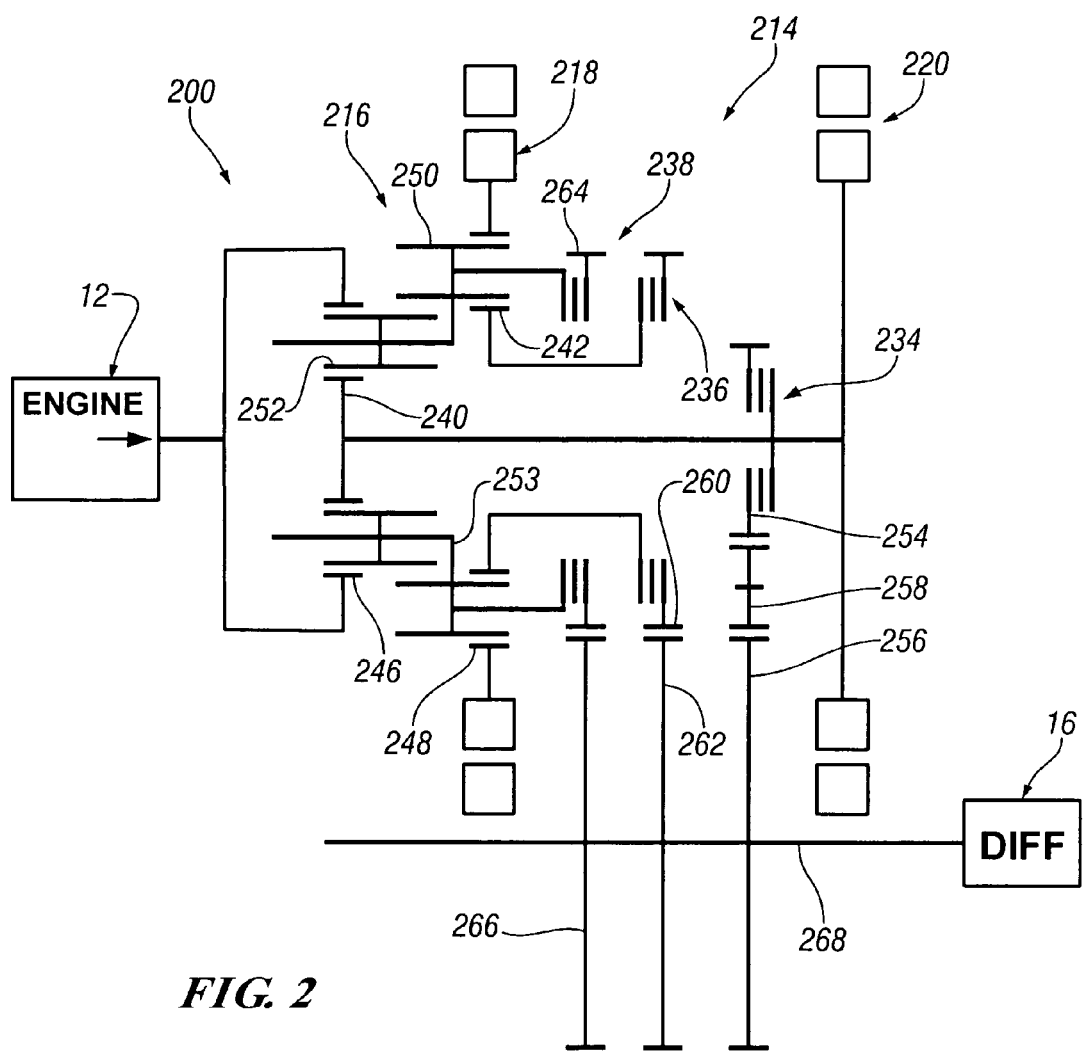
FIG. 2 is a schematic representation of a powertrain incorporating another embodiment of the present invention.

A powertrain 200, shown in FIG. 2, includes a conventional internal combustion engine 12, a conventional final drive differential 16, and a hybrid transmission 214. The hybrid transmission 214 includes a compound planetary gearset 216, a first motor/generator unit 218, a second motor/generator unit 220, and three selectively engageable torque-transmitting mechanisms 234, 236, and 238.

The compound planetary gearset 216 includes a first sun gear member 240, a second sun gear member 242, a first ring gear member 246, a second ring gear member 248, and a plurality of first pinions 250 meshing with a plurality of second pinions 252. The pinions 250 are disposed in meshing relationship with the sun gear member 242 and ring gear member 248 as well as the pinions 252, while the pinions 252 are disposed in meshing relationship with the sun gear member 240 and the ring gear member 246.

The ring gear member 246 is continuously drivingly connected with the engine 12. The ring gear member 248 is continuously drivingly connected with the M/G unit 218. The sun gear member 240 is continuously drivingly connected with the M/G unit 220.

The torque-transmitting mechanism 234 provides a selective drive connection between a gear 254 and a gear 256 through an idler gear 258. The torque-transmitting mechanism 236 provides a drive connection between a gear 260 and a gear 262. The torque-transmitting mechanism 238 provides a drive connection between a gear 264 and a gear 266. The gears 256, 262, and 266 are all drivingly connected with a transmission output shaft 268, which drivingly connects with the final drive differential 16. Each of the gear combinations 254, 256; 260, 262, and 264, 266 provides drive ratios between the respective transmission components and the output shaft 268.

The torque-transmitting mechanism 236 is selectively engageable to connect the sun gear member 242 with the gear 260. The torque-transmitting mechanism 238 is selectively engageable to connect a planet carrier member 253 with the gear 264. The torque-transmitting mechanism 234 is selectively operable to connect the M/G unit 220 with the gear 254.

Figure 4:
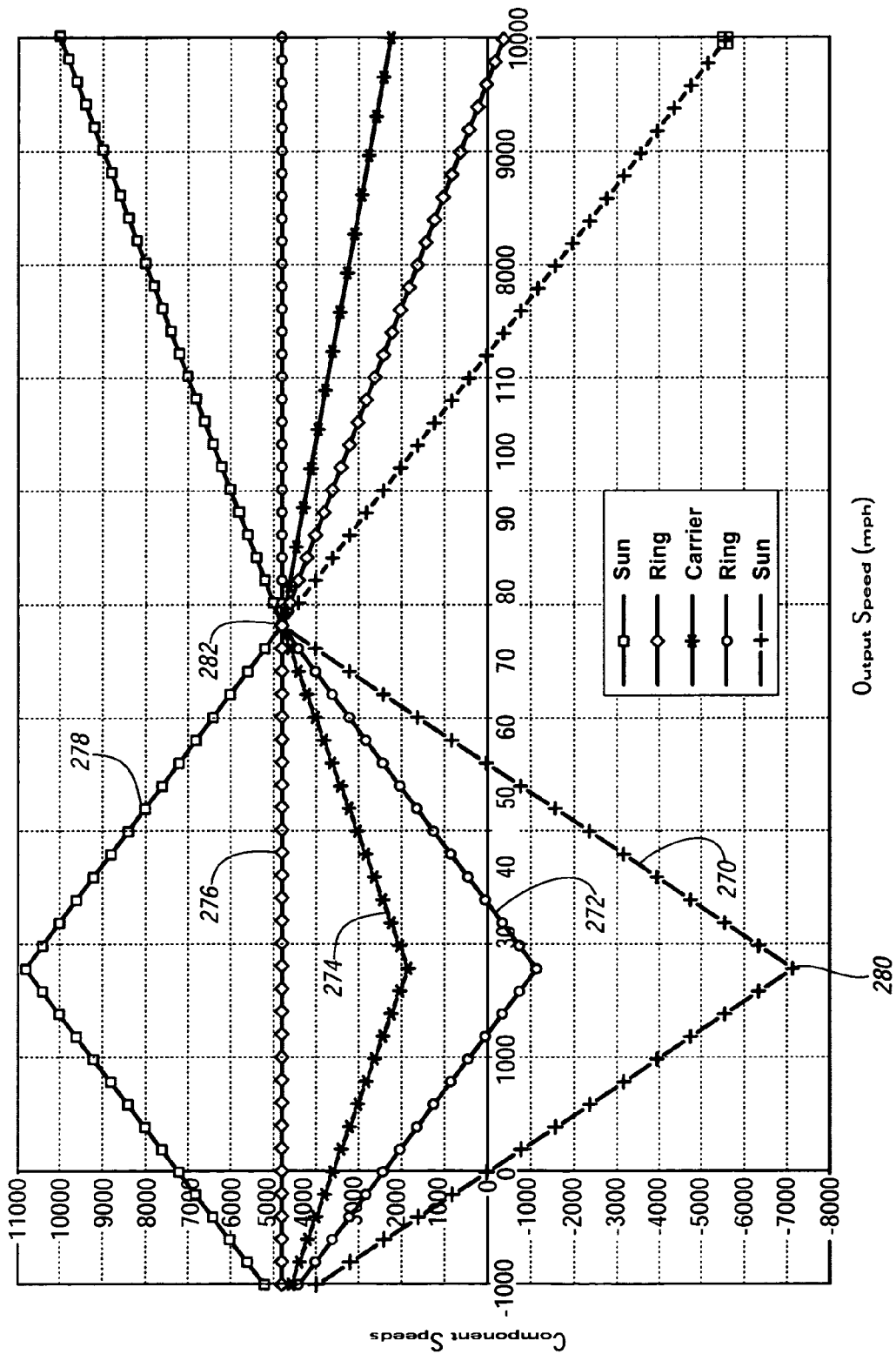
FIG. 4 is a plurality of curves representing the speed components of the gearing mechanism shown in FIG. 2 versus transmission output speed.

The curve shown in FIG. 4 depicts the relative speeds of the components of the planetary gearset 216. The curve 270 represents the speed of sun gear member 240, the curve 272 represents the speed of the ring gear member 248, the curve 274 represents the speed of the planet carrier member 253, the curve 276 represents the speed of the ring gear member 246, and the curve 278 represents the speed of the sun gear member 242.

As with the hybrid transmission 14 shown in FIG. 1, the hybrid transmission 214 of FIG. 2 also provides three modes of operation including an input split mode, a first compound split mode, and a second compound split mode. The first or input split mode is developed between the zero point and point 280. At the point 280, the torque-transmitting mechanisms 234 and 238 are interchanged and the transmission provides a compound split mode of operation between the point 280 and point 282. At point 282, the torque-transmitting mechanisms 238 and 236 are interchanged to establish a second compound split mode of operation, which continues out to the maximum speed of the output shaft 268. At the inception of the second compound split mode at point 282, it will be noted that all of the planetary components are rotating in unison.

The invention claimed is:
1. A hybrid powertrain including a hybrid transmission comprising:
an internal combustion engine;
a first electric motor/generator unit;
a second electric motor/generator unit;

a planetary gearset having five members rotating on substantially the same axis and capable of rotation at five different speeds, wherein the rotational speeds of two of said members are necessary and sufficient for determining the speeds of the other three of said members and wherein one of said members is connected with said internal combustion engine, a second of said members is connected with said first electric motor/generator unit, and a third member is connected with said second electric motor/generator unit;

transmission output gearing means; and said second electric motor/generator unit being connectible with said transmission output gearing means through a first torque-transmitting mechanism, a fourth member of said planetary gearset being connectible with said transmission output gearing means through a second torque-transmitting mechanism, and a fifth member of said planetary gearset being connectible with said transmission output gearing means through a third torque-transmitting mechanism.

2. The hybrid powertrain including a hybrid transmission defined in claim 1, wherein said planetary gearset having five members is comprised of three simple planetary gearsets, each of said simple planetary gearsets comprising a sun gear, a ring gear, and a planet carrier assembly, which is comprised of a plurality of pinion gears rotatably mounted on a planet carrier.

3. The hybrid powertrain including a hybrid transmission defined in claim 1, wherein said planetary gearset having five members is comprised of a single compound planetary gearset, comprising a first sun gear and a second sun gear, a first sun gear and a second ring gear, and a planet carrier assembly, which is comprised of a plurality of pinion gears rotatably mounted on a planet carrier, subdivided into a first set of pinion gears and a second set of pinion gears and disposed in meshing relationship wherein said first set of pinion gears engages said first sun gear, said first ring gear and said second set of pinion gears and wherein said second set of pinion gears engages said second sun gear, said second ring gear, and said first set of pinion gears.

4. A hybrid powertrain including a hybrid transmission comprising:

an engine;

a first electric motor/generator unit;

a second electric motor/generator unit;

a planetary gearset having five members rotating on substantially the same axis and capable of rotating at five different speeds, wherein the rotational speeds of two of said members are necessary and sufficient for determining the speeds of the other three of said members and wherein one of said members is connected with said internal combustion engine, a second of said members is connected with said first electric motor/generator unit, and a third of said members is connected with said second electric motor/generator unit;

three selectively engageable torque transmitting mechanisms; and a transmission output comprising transmission output gearing means having three members connectible between said three output members by individual selective engagement of said three torque transmitting mechanisms to establish an input split mode of operation, a first compound split mode of operation, and a second compound split mode of operation between said engine and said transmission output.

5. The hybrid powertrain including a hybrid transmission defined in claim 4 further comprising:

said engine, said first electric motor/generator, and said second electric motor/generator being continuously interconnected with respective ones of said three members.

* * * * *